J. H. EMERSON.
FRUIT PICKER.
APPLICATION FILED OCT. 2, 1918.
1,388,106.
Patented Aug. 16, 1921.
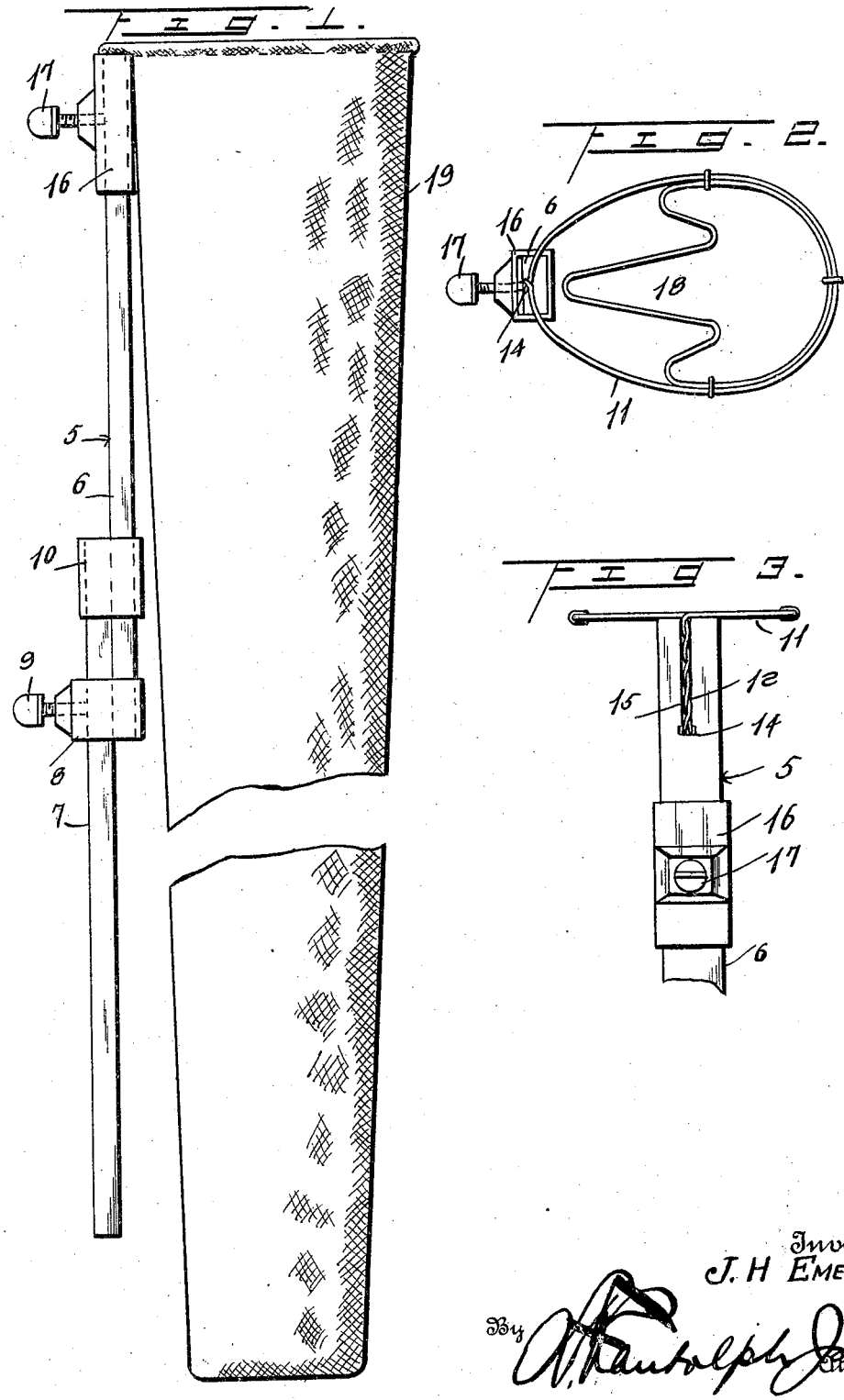
Inventor
J. H. EMERSON

UNITED STATES PATENT OFFICE.

JOHN HENRY EMERSON, OF SYRACUSE, NEW YORK.

FRUIT-PICKER.

1,388,106.　　　　Specification of Letters Patent.　　Patented Aug. 16, 1921.

Application filed October 2, 1918. Serial No. 256,563.

*To all whom it may concern:*

Be it known that I, JOHN H. EMERSON, a citizen of the United States, residing at Syracuse, in the county of Onondaga and State of New York, have invented certain new and useful Improvements in Fruit-Pickers; and I do hereby declare the following to be a full, clear, and exact description of the invention, such as will enable others skilled in the art to which it appertains to make and use the same.

My invention relates to improvements in fruit pickers, having means for detaching fruit from trees and conveying the same safely into a suitable receptacle.

An important object of this invention is to provide a fruit picker of the character described comprising an extensible staff or bar having a combined conveyer support and fruit detaching element detachably secured to its upper end.

A further object of the invention is to provide a device of the character described, which may be taken apart and packed in a small space for shipping, and which may be easily assembled upon reaching its destination.

A further object of the invention is to provide novel means of detachably supporting the conveyer and fruit detaching element through the medium of a collar extended over the upper portion of the extensible staff and engaging a portion of the conveyer support.

A further object of the invention is to provide a device of the character described, which is neat in appearance, few in parts, of highly simplified construction and cheap to manufacture.

A further object of the invention is to provide a device of the character described, which, by virtue of its extreme simplicity and cheapness of manufacture, will meet with commercial favor when placed upon the market.

In the accompanying drawings, forming a part of this specification, and in which like numerals are employed to designate like parts throughout the same, Figure 1 is a side elevation of a fruit picker embodied in the invention, Fig. 2 is a plan view of the same, showing the means for detaching the fruit and supporting the conveyer, and Fig. 3 is a rear elevation of the same, showing the means of securing the conveyer support to the extensible staff or bar.

In the drawings, wherein for the purpose of illustration is shown the preferred embodiment of my invention, the numeral 5 designates an extensible staff or pole, which includes a pair of sections 6 and 7, respectively. The lower end portion of the section 7 is provided with a ferrule 8, extending over the section 6 and provided with a set screw 9, engaging the section 6 for the purpose of adjusting the length of the bar 5. The upper end of the section 6 is provided with a ferrule 10 for engaging the section 7.

As clearly shown in Fig. 2, a conveyer support 11 is attached to the upper end of the section 7, and is composed of a relatively stout wire. The conveyer support is in the form of an elongated loop, and has its end portions twisted together, as shown at 12. The outer ends of the twisted portions 12 diverge outwardly, and extend into an enlarged opening 14 in the upper end of the section 7. The twisted portion 12 of the conveyer support 11 extends into a longitudinally extending groove 15, communicating with the enlarged opening 14. A collar 16, arranged on the upper portion of the section 7, extends over the twisted portion 12, and serves to retain the conveyer support securely in position. A set screw 17 has threaded engagement with the collar 16 and engages the twisted portion 12, and thereby retains the collar and the twisted portion 12 securely in position. With reference to Fig. 1, it will be apparent that the collar 16 may be removed from engagement with the twisted portion 12, and thereby permit of the ready removal of the conveyer support 11 for the purpose of disassembling the apparatus.

As clearly shown in Fig. 2, the conveyer support 11 is formed of a single piece of wire bent intermediate its ends to form a fruit-engaging arm 18. The fruit-engaging member 18 is approximately U-shape, and is disposed centrally of the conveyer support 11. Secured to the conveyer support 11 by stitching, or other suitable means, is a conveyer 19, which, in the practice of the invention, is of any suitable fabric, such as canvas or duck.

In the practice of my invention, it will be apparent that in assembling the apparatus the conveyer support 11 is positioned above the section 7 and engaged therewith through the medium of the collar 16. In the picking of the fruit, the fruit-engaging arm 18 severs the stems of the fruit, and thereby permits the fruit to fall through the conveyer 19. For the purpose of retarding the velocity of the fruit in passing through the conveyer, the lower portion thereof may be inclined at any desired angle. The conveyer may discharge the fruit into any desired receptacle.

While I have shown and described the preferred embodiment of my invention, it is understood that I may make such minor changes in arrangement and construction of parts as will remain within the spirit of the invention and the scope of the appended claim.

Having thus described my invention, what I claim is:

A fruit picker comprising a shaft provided at its side with a groove leading from one end thereof, and provided at its inner end with an enlargement, a loop member having an angularly disposed tang which is received in the groove and in the enlargement thereof, a sleeve member adapted to fit over the end portion of the shaft and inclose the groove and the tang and a set screw carried by the sleeve member and adapted to engage the tang.

In testimony whereof I affix my signature in presence of two witnesses.

JOHN HENRY EMERSON.

Witnesses:
 GEO. J. TOMANEY,
 CLAYTON N. EMERSON.